US007941815B2

(12) United States Patent
Ionescu (10) Patent No.: US 7,941,815 B2
(45) Date of Patent: May 10, 2011

(54) AUTOMATIC DEVICES, EQUIPMENT AND METHODS FOR HANDLING OBJECTS

(76) Inventor: Anton V. Ionescu, Hayward, CA (US)

( * ) Notice: Subject to any disclaimer, the term of this patent is extended or adjusted under 35 U.S.C. 154(b) by 687 days.

(21) Appl. No.: 12/029,380

(22) Filed: Feb. 11, 2008

(65) Prior Publication Data

US 2008/0134223 A1    Jun. 5, 2008

Related U.S. Application Data

(62) Division of application No. 11/090,482, filed on Mar. 26, 2005, now Pat. No. 7,360,812.

(60) Provisional application No. 60/556,857, filed on Mar. 27, 2004.

(51) Int. Cl.
*G11B 17/04* (2006.01)

(52) U.S. Cl. .................................... 720/619

(58) Field of Classification Search .................. 720/619, 720/601, 636, 604, 661, 690, 652, 697, 647, 720/651, 714, 700, 653, 659, 646, 713
See application file for complete search history.

(56) References Cited

U.S. PATENT DOCUMENTS 6,029,230 A * 2/2000 Ng ................................ 711/159
7,509,660 B2   3/2009 Liu et al.

* cited by examiner

*Primary Examiner* — Allen T Cao
(74) *Attorney, Agent, or Firm* — Law Office of Andrei D Popovici, PC (57) ABSTRACT

According to some embodiments, CD/DVDs are transported to/from a horizontal tray of a disk-processing unit (e.g. a disk drive) by applying a vertical lifting force to each disk at an off-center disk engagement location to incline the disk toward the tray, maintaining the disk in an inclined position toward the processing unit during a vertical travel to/from the tray; and gliding the disk into the tray from the inclined position to a final horizontal position by vertically delivering the disk into the tray. In some embodiments, a CD/DVD transfer apparatus comprises a pickup head for picking up and releasing disks, a horizontal-motion arm driving a horizontal motion of the pickup head, and a flexible vertical connection coupling the pickup head to the horizontal-motion arm. The flexible vertical connection is formed by a section of a flexible wire, thread, ribbon or tape coiled on a reel situated above the pickup head.

17 Claims, 5 Drawing Sheets

AUTOMATIC DEVICES, EQUIPMENT AND METHODS FOR HANDLING OBJECTS

CROSS-REFERENCE TO RELATED APPLICATIONS

This application is a divisional of U.S. patent application Ser. No. 11/090,482, filed Mar. 26, 2005 now U.S. Pat. No. 7,360,812, which claims the benefit of U.S. Provisional patent application Ser. No. 60/556,857, filed Mar. 27, 2004, both of which are herein incorporated by reference.

BACKGROUND OF THE INVENTION

The invention relates to automated devices and equipment for handling objects, and in particular to devices and equipment used for handling information-storage medium objects such as compact discs.

Many technologies require objects to be automatically and repetitively transported to/from specified locations in order to be processed. A wide diversity of pick-up devices and specialized equipment for transporting and processing such objects has been developed during the last two decades within the media industry, for processing of recordable information carriers like CD and DVD.

Some existing solutions may be too complex or otherwise inappropriate for applications where high precision is needed in order to separate thin stacked objects, such as CDs or DVDs. In addition, some CD/DVD processing systems do not allow a horizontal disk to be vertically placed directly into a processing unit tray, particularly if a part of the circular disk holder is masked by the front cover of the equipment.

SUMMARY

According to one aspect, an automated method of transporting an information-encoding disk to/from a horizontal tray of a processing unit comprises: causing the disk to incline towards the processing unit by vertically lifting the disk from the horizontal tray by applying a vertical lifting force to the disk at an off-center engagement location along the disk; maintaining the disk in an inclined position towards the processing unit during a vertical travel to/from the horizontal tray; and causing the disk to glide into the tray from the inclined position to a final horizontal position by vertically delivering the disk into the horizontal tray.

According to another aspect, an information-encoding disk transfer apparatus comprises a pickup head for picking up and releasing information-encoding disks; a horizontal-motion arm for driving a horizontal motion of the pickup head; and a flexible vertical connection coupling the pickup head to the horizontal-motion arm. The flexible vertical connection is formed by a section of a flexible wire, thread, ribbon or tape. The wire, thread, ribbon or tape is coiled on a reel situated above the pickup head. Controlling an extent of the wire, thread, ribbon or tape coiled on the reel controls a vertical position of the pickup head to raise and lower information-encoding disks picked up by the pickup bead.

According to another aspect, an assembly for handling information-encoding disks comprises a plurality of disk stack retainers situated underneath a first horizontal plane, each disk stack retainer being capable of holding a stack of information-encoding disks; a disk-processing unit having at least one disk-holding tray for holding an information-encoding disk, the tray being positioned underneath the first horizontal plane; and a disk-handling robot positioned above the first horizontal plane, for gripping/releasing, vertically lifting/lowering, and horizontally transporting sequentially a plurality of information-encoding disks between the tray and corresponding retainers of the plurality of disk-stack retainers.

According to another aspect, an interactive method for positioning a plurality of information-encoding disk stack retainers to be accessed by a disk-handling robot at a plurality of positions situated along an arc around the robot comprises performing the following sequence of steps for each retainer: placing a positioning device at a pick-up location of the robot; employing the robot to move the positioning device from the pick-up location to a selected position of the plurality of positions; and placing a disk-stack retainer support over the positioning device to center the disk-stack retainer support at the selected position.

DESCRIPTION

A number of technologies allow automatically and repetitively transporting objects to/from specified locations in order to be processed. A pickup device commonly alternately picks-up an object from a source location and releases it at a destination location.

The present invention discloses pickup devices and methods for sequentially gripping, holding and releasing multiple similar objects such as compact discs. According to some embodiments, a pickup device is capable of alternately switching between object engaging/disengaging states by itself, using a self-contained switching mechanism automatically triggered each time the device reaches an end-of-travel position. The device may use a single external axial movement for both transporting the pickup device towards the object holder and engaging/disengaging the object, thus simplifying the device and decreasing its cost.

According to some embodiments, a pickup device comprises a guiding element with a stopping shoulder enabling self-adjustment to an optimal position when placed against the object. A set of grippers are secured to the guiding element, and are capable of establishing contact with the object. When engaging the object, the grippers are actuated before the guiding element starts moving. This feature enables gripping precision, which may be desirable especially when working with stacked objects to be separated.

According to some embodiments, pierced gripping blades housed inside the guiding element are penetrated by thin curved arms rigidly attached to an actuator. The actuator is connected to external transport means, and is capable of axially moving with respect to the guiding element within a short travel range. The arms move axially together with the actuator and glide through the holes of the gripping blades, forcing the protrusive grippers to radially glide out their housing to engage the object, or respectively retract inside the guiding element to release the object, according to the pickup device status. These features allow error free operation of the pickup device, and allow a single external action to both axially transport the pickup device and actuate the grippers. When appropriate, the grippers may glide under the object, supporting it from beneath. Using the grippers to support the object from underneath secures the object during transport and relieves the arms from tension.

According to some embodiments, a pickup device may use a two-component switching mechanism similar to ones used by retractable ball-point pens. For a description of an exemplary switching mechanism see for example U.S. Pat. No. 5,997,204. Using such a switching mechanism allows simplifying the device construction. In such a switching mechanism, one component of the switching mechanism is rigidly attached to an actuator so the component and the actuator move together axially when driven by a transport means. A second component of the switching mechanism is attached to a guiding element by a retaining pin and allowed to spin around a common axis, but not to move away axially.

According to some embodiments, for applications in which objects are to be lifted, a hanging picker can be vertically ascended and descended using flexible means such as thread, wire, flexible ribbon or tape. Using a flexible connection removes the need for a vertical traveling supporting arm, or for a frame or vertical shaft for the picker to travel along. The object handling robot becomes very simple and small, allowing though long vertical travel for the picker, said large automated processing capacity.

Figure 7:
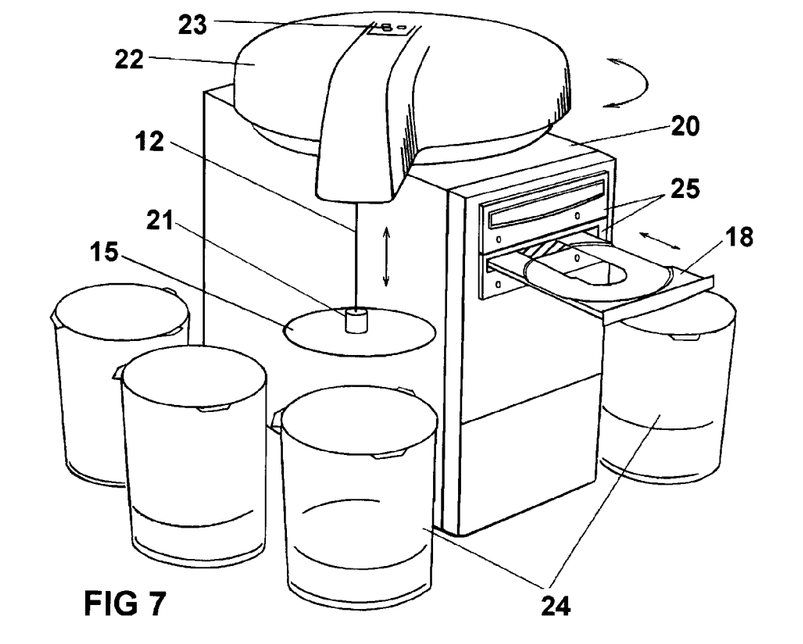
FIG. 7 shows a perspective view of a robot according to some embodiments of the present invention.

A versatile robot as described herein may be used to automate a wide variety of CD/DVD master processing equipment by placing the robot above the master processing equipment. The disks (e.g. CD or DVD) are vertically stacked and delivered to/from retainers located under the surface supporting the robot, and accessed from above. One exemplary embodiment using such a configuration is shown in FIG. 7. Depending on the number of disks to be processed, a user can choose the number and positions of the disk retainers to be used during each automated processing cycle. The disk retainers may be positioned at selected locations using a simple, fast and effective procedure. Such a procedure may use the robot to deliver a positioning device to a selected location. Subsequently, a user transfers a retainer over the positioning device and takes the positioning device away (see FIGS. 9-A-C).

Figure 5:
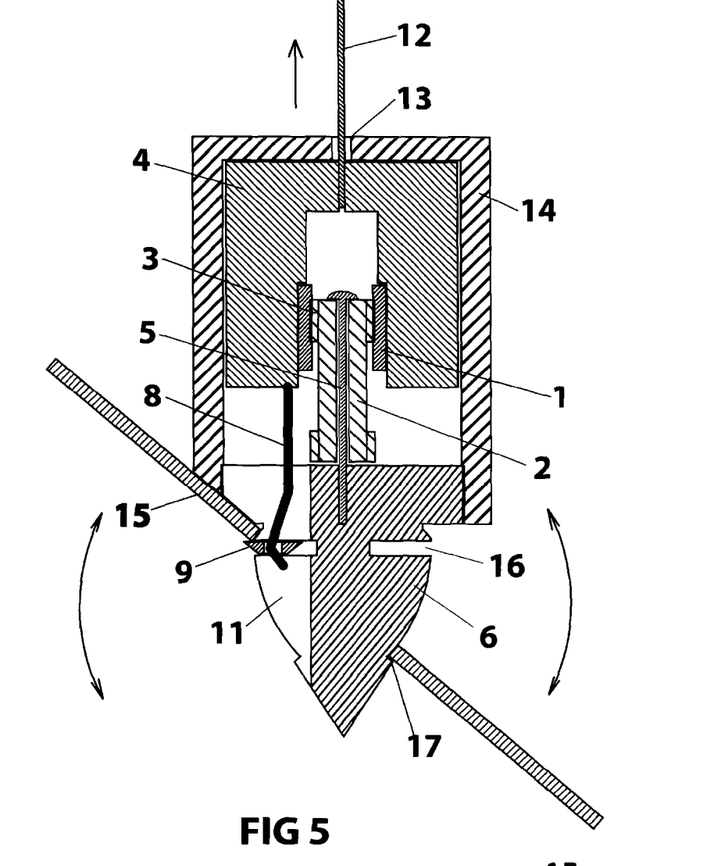
FIG. 5 shows a side cross-sectional view of the pickup device of FIGS. 2-3 in an object-engaged state with an inclined disk, according to some embodiments of the present invention.
Figure 6A:
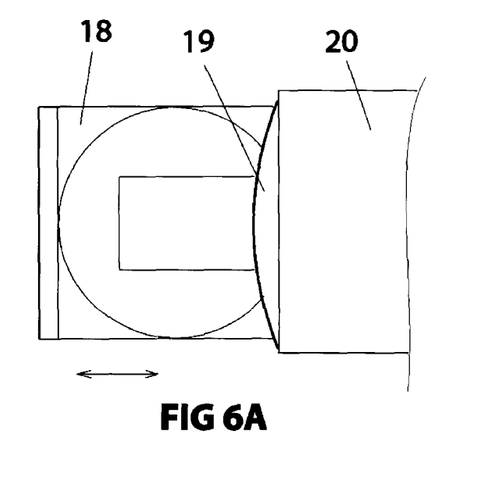
FIGS. 6A-B show schematic views of a processing unit with a tray having a partially-masked disk-holding area, and of a trajectory of an inclined disk being vertically transported to/from such a tray, respectively, according to some embodiments of the present invention.

Some existing CD/DVD processing equipment does not allow a horizontal disk to be vertically placed directly into a processing unit tray, particularly if a part of a circular disk holder area is masked by a front cover of the equipment (see FIG. 6A). A method and corresponding embodiment are disclosed wherein the disk is inclined toward the processing equipment when lifted from its horizontal tray by a vertically-moving pickup device, and glides into the tray from its inclined position to a final horizontal position when vertically delivered by the picking device into the tray, allowing automatic loading/unloading disks into such processing equipment (see FIGS. 5 and 6A-B).

According to some embodiments, a pickup device for gripping, holding and releasing similar objects such as compact discs does not require any additional external actuation for gripping the object. The pickup device is able to alternately switch between object engaging/disengaging states by itself, by means of a self contained switching mechanism, automatically triggered each time the device reaches an end-of-travel position with respect to an object holder. For ease of description the various handled objects will be referred hereinafter as "disks". For simplicity, in the preferred embodiments described, the object holders are horizontal, the disks are vertically stacked and the pickup device moves vertically along the axis of the object holder in order to engage or disengage a disk, being subsequently transported above a different location.

According to some embodiments, many types of known switching mechanisms can be used in a pickup device. Exemplary switching mechanisms include mechanisms similar to those used in some retractable ball-point pens or some push-button electric switches. For simplicity, the description below focuses on a switching mechanism similar to one described in U.S. Pat. No. 5,997,204. The functioning of the switching mechanism is described briefly below, in order to ease further description of the pickup device itself.

Figures 1A, 1B:
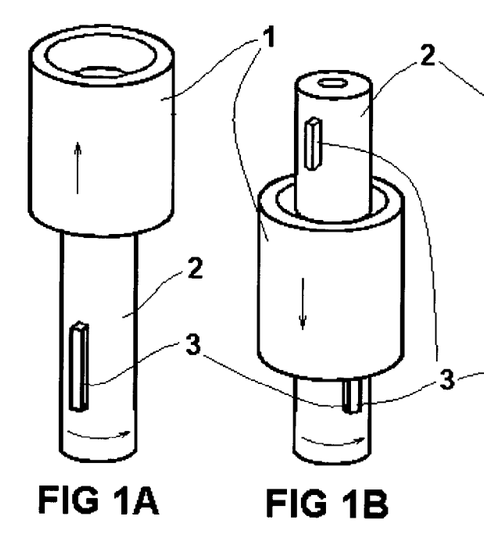
FIGS. 1A-C show perspective views of a switching mechanism in different states.
Figure 1C:
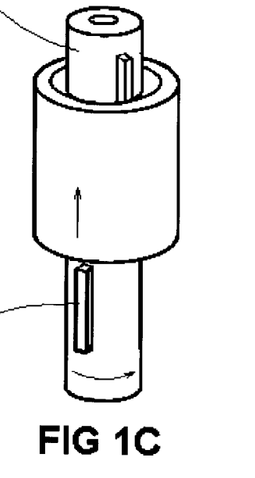

As shown in FIGS. 1A-C, an exemplary switching mechanism comprises two parts: a cylindrical pin 2 having two pairs of diametrically opposed protruding ribs 3 and a cylindrical ring 1 comprising grooves and saw-teething on its inner surface (not shown). Consider the switching mechanism positioned vertically, with pin 2 allowed to rotate. When the ring 1 is axially moved upwards along the central pin 2, the ribs 3 glide on the inclined surface of the teeth, the pin 2 rotates and the ring stops in the position shown in FIG. 1A, when the upper ribs 3 reach the deepest points of the current saw-teeth grooves so the ring 1 grips the pin 2. The position shown in FIG. 1A corresponds to a disk-engaged state in the description below. When the ring 1 is axially moved downward (in the opposite direction), the other pair of ribs 3 glides on the saw-teething on the other side of the ring 1, the pin 2 rotates and the ring 1 stops in the position shown in FIG. 1B, when the ribs 3 reach the deepest points of the current saw-teeth. The position shown in FIG. 1B is referred to below as a switching position. When subsequently the ring 1 is moved upward again, the process repeats, but the ring 1 will grip the pin 2 and stop after a shorter vertical travel, as shown in FIG. 1C, due to the different shape of the corresponding saw-teeth. The position shown in FIG. 1C corresponds to a disk-disengaged state in the description below. The device transitions in sequence between disk-engaged, switching, and disk-disengaged states, and vice-versa.

Figure 2:
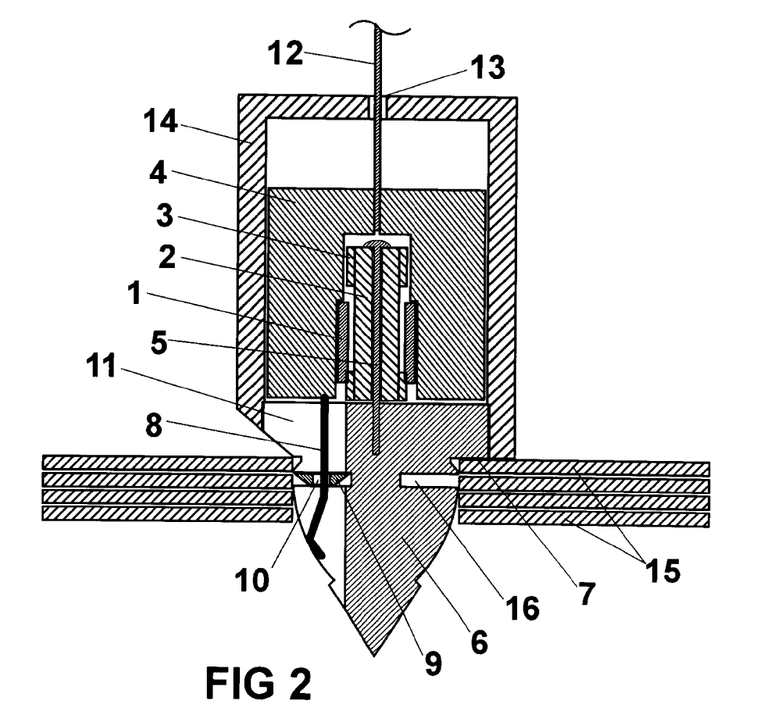
FIG. 2 shows a side cross-sectional view of a pickup device placed against stacked objects (e.g. disks), according to some embodiments of the present invention.

As shown in FIG. 2, a picking device includes a guiding element 6 having a stopping shoulder 7. Stopping shoulder 7 enables the picking device to self-adjust its position to an optimum when placed against an object 15. Object 15 may be a disk. A central pin 5 connects the guiding element 6 with the pin 2, which forms part of the switching mechanism of FIGS. 1A-C, allowing pin 2 to spin around a common central axis.

An actuator 4 is attached to an external axial movement means (transport means, or transport connection) 12, by which the entire pickup device is transported. Transport connection 12 may include a flexible connection formed by thread, wire, flexible ribbon or tape. Actuator 4 comprises a central cylindrical bore that houses the ring 1, which forms part of the switching mechanism of FIGS. 1A-C. The ring 1 is rigidly attached to the actuator 4.

Each time the guiding element 6 stops on an object holder, the actuator 4 continues its axial movement until eventually actuator 4 gets closest to the guiding element 6, when the mechanism reaches its switching position. Transport connection 12 is used to pull actuator 4 away from guiding element 6. Actuator 4 moves away from guiding element 6 up to a maximum distance between actuator 4 and guiding element 6, and subsequently pulls guiding element 6 along. The maximum distance between actuator 4 and guiding element 6 depends on the current state of the switching mechanism, and alternates between a short and a long travel distance. The picking device alternates between object-engaging and object-disengaging states.

One or more grippers 9 are actuated by the motion of actuator 4 with respect to guiding element 6. Grippers 9 may include gripping blades having sharp outer edges. Grippers 9 are secured to the guiding element 6. When guiding element 6 engages an object 15, grippers 9 are actuated before guiding element 6 starts moving. Actuating grippers 9 before guiding element 6 starts moving improves the gripping precision, which facilitates the separation of stacked objects 15.

Grippers 9 are housed in one or more recesses 16. When actuated, grippers 9 protrude out of recesses 16. In some embodiments, the axial distance between the stopping shoulder 7 and the sharp edges of grippers 9 is slightly bigger than the thickness of each object 15, allowing grippers 9 to grasp one object 15 from beneath when grippers 9 are actuated.

Grippers 9 comprise holes 10 for receiving thin curved arms 8. Each curved arm 8 passes through a corresponding hole 10. Arms 8 are rigidly attached to actuator 4. Guiding element 6 has thin radial ditches (channels) 11 (shown also in FIGS. 4A-B) allowing the arms 8 to travel freely when the actuator 4 moves axially against guiding element 6. A dust-protective frame 14 may be rigidly attached to the guiding element 6. Frame 14 allows room for the actuator 4 to move axially with respect to the guiding element 6 within its entire travel range. Frame 14 comprises a hole 13 along the top of frame 14, opposite guiding element 6, for allowing the transport connection 12 to pass through.

When the actuator 4 is axially pulled away from the guiding element 6 by the transport connection 12, the arms 8 glide along the channels 11 and through the holes 10 of the pierced blades 9. If the pickup mechanism is in a disk-engaged state, the switching mechanism allows element 4 to rise sufficiently, and arms 8 push the grippers 9 to glide out of their recesses 16. Guiding element 6 starts moving together with actuator 4, and the entire picking device 21 (see FIG. 7) is moved by transport connection 12.

Figure 4A:
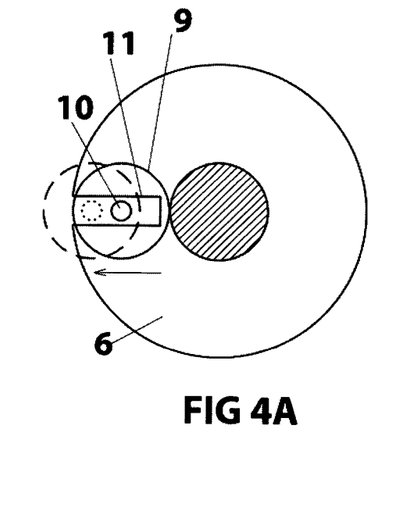
FIGS. 4A-B show top cross-sectional views of a guiding element along a gripper housing plane, according to some embodiments of the present invention.
Figure 4B:
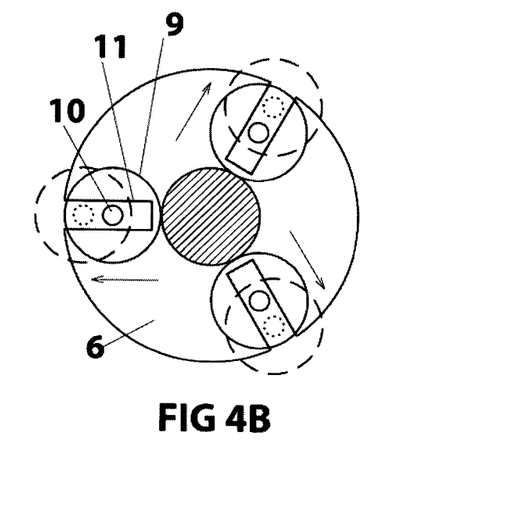
Figure 8:
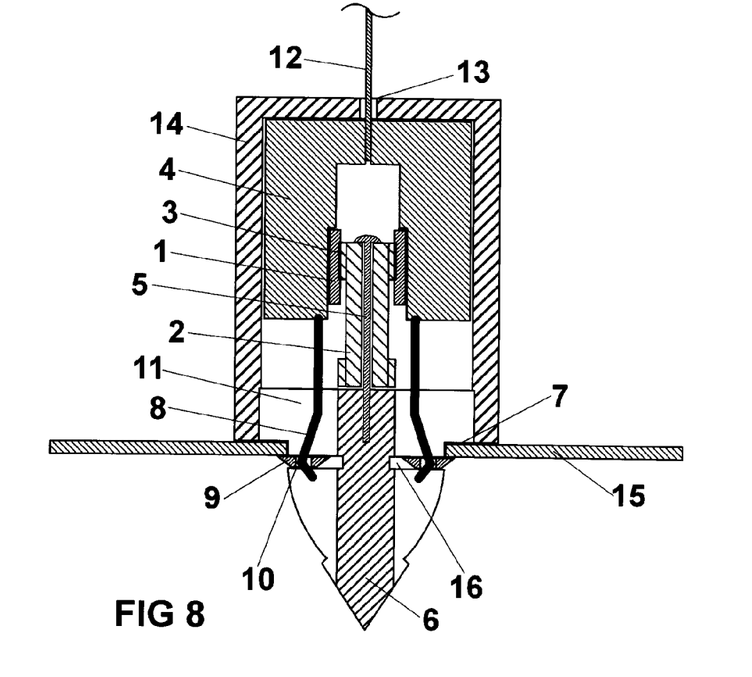
FIG. 8 shows a cross-sectional view of the pickup device of FIGS. 2-3 in an object-engaged state with a horizontal disk, according to some embodiments of the present invention.

Consider a picking device placed against a stack of disks 15 as shown in FIG. 2, with the shoulder 7 laying on the top disk 15, and the mechanism in the switching position shown in FIG. 1B. The actuator 4 is closest to the guiding element 6, and the arms 8 keep the gripping blades 9 completely retracted inside their recesses 16. If the picking device was in a disk-disengaged state when placed against the stack of disks 15, the picking device will engage a disk 15 the next time the picking device is lifted from the stack of disks 15. When the transport connection 12 axially pulls actuator 4 away from the guiding element 6, which rests resting on a disk 15 underneath, the arms 8 glide through the holes 10 of the pierced grippers 9 and push grippers 9 to glide out of the guiding element 6. The sharp edges of grippers 9 then protrude under the first disk 15 in the stack. Subsequently, the guiding element 6 starts moving together with the actuator 4. The entire pickup device 21 (FIG. 7) is lifted by transport connection 12, and carries away the engaged disk 15, as shown in FIG. 5. The sectional views in FIGS. 4A-B show the radial movement of the grippers 9 in two possible embodiments, with a single gripping blade and respectively with more gripping blades. FIG. 8 shows an embodiment of the pickup device having multiple grippers 9 in a disk-engaged state. In the embodiment shown in FIG. 8, a picked disk 15 keeps its horizontal position during transport.

Consider now an engaged disk 15 transported to be released at a new location. The transport connection 12 vertically lowers the pickup device at the location of interest. When the disk 15 reaches a disk holder, the guiding element 6 stops with its shoulder 7 laying on the disk. The actuator 4 continues its movement, approaching the guiding element 6. The arms 8 glide through the holes 10 of the pierced grippers 9, forcing grippers 9 to retract completely inside the guiding element 6. The movement stops when the actuator 4 reaches its lowest position, closest to the guiding element 6. The pickup device is then in a switching position, shown in FIG. 2.

Figure 3:
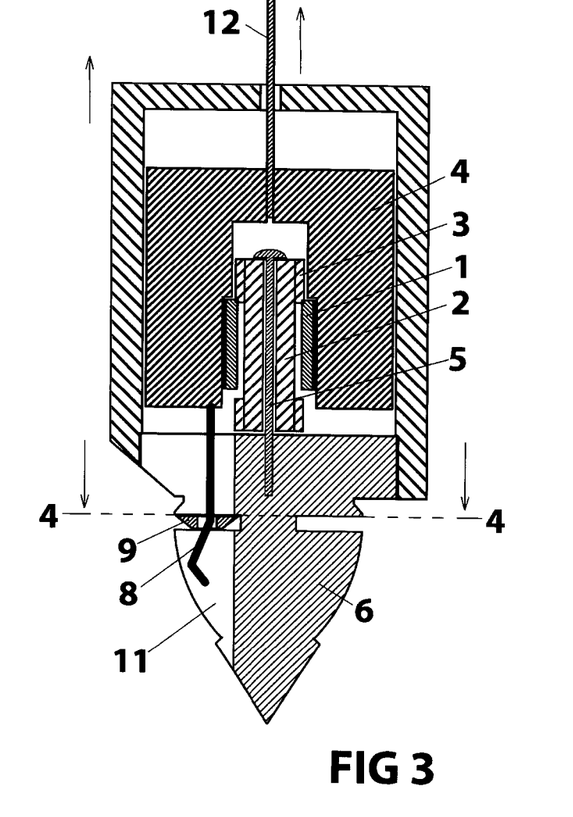
FIG. 3 shows a side cross-sectional view of the pickup device of FIG. 2 in an object-disengaged state, according to some embodiments of the present invention.

The next lifting will occur with the pickup device in a disk-disengaged state. Actuator 4 grips the guiding element 6 after a short travel, before the arms 8 start pushing the grippers 9 out, so the grippers 9 will not protrude out of the guiding element 6. The pickup device 21 (FIG. 7), lifted by transport connection 12, leaves unloaded as shown in FIG. 3, and the previously-delivered disk 15 remains in its holder.

The cycle described above may be repeated multiple times. The pickup device 21 alternates between disk-engaged and disk-disengaged states each time pickup device 21 reaches the down-end-of-travel position at an object holder.

In some embodiments, if the pickup device 21 moves vertically towards the disk holder in order to engage or disengage a disk 15, the pickup device 21 can hang gravitationally. Pickup device 21 may be ascended/descended using a flexible transport connection 12 including thread, wire, flexible ribbon or tape. A solution using a flexible connection 12 allows simplifying the automation equipment, since there is no need for a vertical traveling arm, or for a frame or vertical shaft for the picker to travel along. Moreover, using a flexible connection allows achieving relatively long vertical travel for the pickup device, which in turns allows achieving large handling capacities for a relatively small and flat disk handling robot. The transport connection 12 being simply coiled on a reel inside the robot and guided out on a pulley attached to a horizontally-moving part of the robot. The pickup device 21 is lifted up to its highest position where a generally-cylindrical holder under the pulley houses pickup device 21. The cylindrical holder maintains the vertical position of pickup device 21 and prevents pickup device 21 from waggling during a horizontal movement from a disk holder to another.

As shown in FIG. 7, the robot may be positioned in such a way that it can access from above the disk holders of interest. The disk holders of interest may include the trays of the disk processing equipment and retainers holding stacks of processed/unprocessed disks. A robot 22 is placed over a disk processing master equipment 20. Master equipment 20 comprises processing units 25 provided with trays 18. Requests for disk changing may be sent to the robot 22 by the master equipment 20 whenever needed, for example via a RS232 interface. Disk retainers 24 for the disk stacks are placed on a table around the master equipment 20 served by the robot 22. The robot 22 may comprise a keyboard 23 for interfacing with a human operator. Depending on the number of disks to be processed, a user can choose the number and the positions of the disk retainers 24 to be used during each automated processing cycle. Once a configuration is selected, the user places the disk retainers 24 on the table, precisely at the locations to be accessed by the robot 22.

Figure 9A:
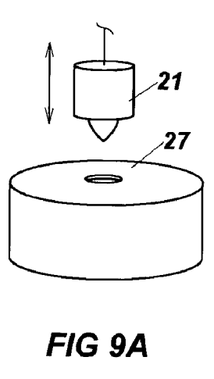
FIGS. 9A-C show a sequence for positioning a stack retainer, including: delivering a positioning device to a selected location (FIG. 9A), transferring a retainer over the positioning device (FIG. 9B), and taking the positioning device away (FIG. 9C), according to some embodiments of the present invention.
Figure 9B:
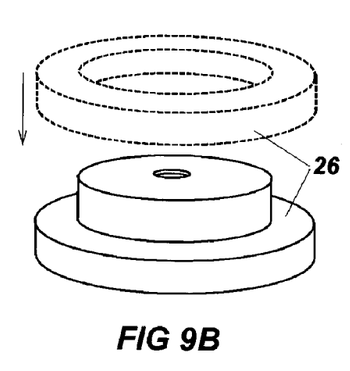
Figure 9C:
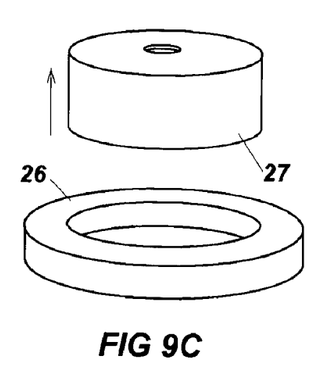

The following procedure may be repeated for each disk retainer 24 to be positioned at a desired location:

- a user selects the desired location using the keyboard 23, and places on the tray 18 a positioning device 27 (FIG. 9A); positioning device 27 may be generally-cylindrically shaped and hollow, and may include a top cover with a central hole similar to a regular disk to be picked up, so the robot can handle positioning device 27 like an ordinary disk;
- the robot picks up, transports and releases the positioning device 27 on the table to the selected location; then the pickup device 21 ascends into its housing, as illustrated by the arrow in FIG. 9A;
- the user transfers a supporting device 26 (FIG. 9B) over the positioning device 27 so located; supporting device 26 may be generally ring-shaped, and may comprise an opening that fits the outer size of the positioning device 27 so that supporting device 26 surrounds the positioning device 27 and attaches to the table, for example by self sticking means;
- the user takes away the positioning device 27 (FIG. 9C) and places a disk retainer over the supporting device 26 so fixed on the table; the bottom shape of the disk retainer mates the shape of the supporting device 26 so that the disk retainer cannot move horizontally; for CDs or DVDs, the original plastic cylindrical covers of regular commercial disk spindle packages can be used as disk retainers.

Figure 6B:
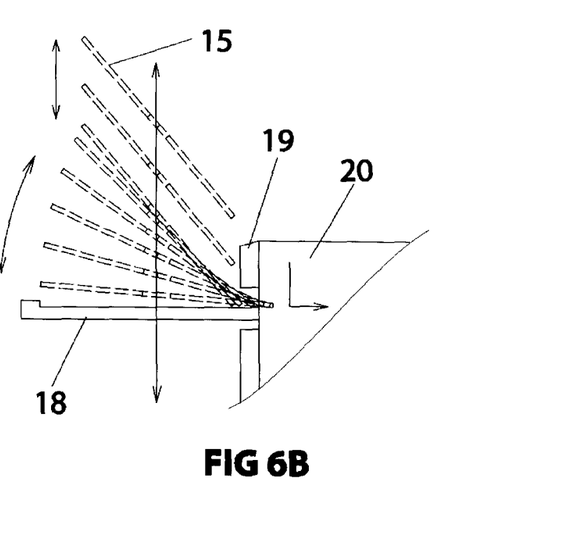

As illustrated in FIG. 6A, some current CD/DVD processing equipment does not allow a horizontal disk to be vertically placed directly into a tray 18 of a processing unit (FIG. 6A), since a part of the circular disk holder area is masked by a front cover 19 of the equipment. As shown in FIG. 6B, a disk 15 may be transported to/from and delivered into the tray 18 without interfering with the front cover 19 if the disk is inclined towards the processing equipment during vertical travel along the central axis of the circular disk holder of such a tray. The embodiment of the pickup device shown in FIG. 5 can deliver a disk to/from such a tray as follows: the gripping blade 9 hooks the disk 15 asymmetrically, from the side opposite the equipment. When lifted, the disk 15 inclines towards the processing equipment up to the desired angle, e.g. about 45 degrees, when disk 15 reaches a stopping shoulder 17 on the guiding element 6. Guiding element 6 is shaped to allow the disk 15 to rotate freely while preventing disk 15 from falling. The transport connection 12 does not allow the pickup device to spin around its axis, so the disk 15 maintains its inclined orientation towards the equipment during its vertical travel. As shown in FIG. 6B, when the disk 15 is vertically descended in order to be released into tray 18, the lower edge of disk 15 glides into the tray 18 and the disk 15 rotates from its inclined position to a final horizontal position.

The above embodiments may be altered in many ways without departing from the scope of the invention. Accordingly, the scope of the invention should be determined by the following claims and their legal equivalents.

What is claimed is:

1. An assembly for handling information-encoding disks, comprising:
   - a plurality of disk stack retainers situated underneath a first horizontal plane, each disk stack retainer being capable of holding a stack of information-encoding disks;
   - a disk-processing unit having at least one disk-holding tray for holding an information-encoding disk, the tray being positioned underneath the first horizontal plane; and
   - a disk-handling robot including a horizontal-motion arm positioned above the first horizontal plane, the robot being configured to pick-up and release, vertically lift and lower, and horizontally transport sequentially a plurality of information-encoding disks between the tray and corresponding retainers of the plurality of disk-stack retainers.

2. The assembly of claim 1, wherein the horizontal plane is defined by a top surface of the disk-processing unit, and wherein the disk-handling robot rests on the top surface of the disk-processing unit.

3. The assembly of claim 2, wherein the disk-processing unit comprises a personal computer having a disk drive including the tray.

4. The assembly of claim 1, wherein the disk-processing unit comprises a personal computer having a disk drive including the tray.

5. The assembly of claim 1, wherein the plurality of retainers are positioned along an arc around the disk-processing unit.

6. The assembly of claim 1, wherein the plurality of retainers and the disk-processing unit rest on a common horizontal surface defining a second horizontal plane.

7. The assembly of claim 1, wherein the disk-handling robot comprises:
   - a pickup head for picking up and releasing information-encoding disks, wherein the horizontal-motion arm drives a horizontal motion of the pickup head; and
   - a flexible vertical connection coupling the pickup head to the horizontal-motion arm, the flexible vertical connection being formed by a section of a flexible wire, thread, ribbon or tape, wherein controlling the flexible vertical connection controls a vertical position of the pickup head to raise and lower information-encoding disks picked up by the pickup head.

8. The assembly of claim 7, wherein the disk-handling robot is configured to:
   - cause the disk to incline towards the processing unit by vertically lifting the disk from the disk-holding tray by applying a vertical lifting force to the disk at an off-center engagement location along the disk;
   - maintain the disk in an inclined position towards the processing unit during a vertical travel to/from the disk-holding tray; and
   - cause the disk to glide into the disk-holding tray from the inclined position to a final horizontal position by vertically delivering the disk into the disk-holding tray.

9. The assembly of claim 1, wherein the disk-handling robot is configured to:
   - cause the disk to incline towards the processing unit by vertically lifting the disk from the disk-holding tray by applying a vertical lifting force to the disk at an off-center engagement location along the disk;
   - maintain the disk in an inclined position towards the processing unit during a vertical travel to/from the disk-holding tray; and
   - cause the disk to glide into the disk-holding tray from the inclined position to a final horizontal position by vertically delivering the disk into the disk-holding tray.

10. An interactive method for positioning a plurality of information-encoding disk stack retainers to be accessed by a disk-handling robot at a plurality of positions situated along an arc around the robot, the method comprising performing the following sequence of steps for each retainer:

placing a positioning device at a pick-up location of the robot;

employing the robot to move the positioning device from the pick-up location to a selected position of the plurality of positions; and placing a disk-stack retainer support over the positioning device to center the disk-stack retainer support at the selected position.

11. The method of claim 10, further comprising placing a disk-stack retainer over the disk-stack retainer support to center the disk-stack retainer at the selected position.

12. The method of claim 11, wherein the pick-up location is a location of a tray of a processing unit, the robot being configured to move information-encoding disks between the tray and the plurality of disk-stack retainers.

13. The method of claim 11, wherein the positioning device has a top aperture identical to an information-encoding disk central aperture.

14. The method of claim 13, wherein the disk-stack retainer support comprises a ring sized to mate with a bottom surface of the disk-stack retainer.

15. An apparatus for handling information-encoding disks, comprising:

a disk-handling robot including a horizontal-motion arm positioned above a first horizontal plane, the robot being configured to pick-up and release, vertically lift and lower, and horizontally transport sequentially a plurality of information-encoding disks between a disk-holding tray of a disk-processing unit and a plurality of disk-stack retainers, wherein the disk-holding tray and the plurality of disk-stack retainers are positioned underneath the first horizontal plane, and wherein each disk-stack retainer is capable of holding a stack of information-encoding disks.

16. The apparatus of claim 15, wherein the disk-handling robot comprises:

a pickup head for picking up and releasing information-encoding disks, wherein the horizontal-motion arm drives a horizontal motion of the pickup head; and a flexible vertical connection coupling the pickup head to the horizontal-motion arm, the flexible vertical connection being formed by a section of a flexible wire, thread, ribbon or tape, wherein controlling the flexible vertical connection controls a vertical position of the pickup head to raise and lower information-encoding disks picked up by the pickup head.

17. The apparatus of claim 15, wherein the plurality of disk-stack retainers are positioned along an arc around the disk-holding tray.

* * * * *